United States Patent [19]
Hamilton

[11] 3,749,143
[45] July 31, 1973

[54] METHOD AND APPARATUS FOR FELLING TREES

[75] Inventor: Douglas D. Hamilton, Mount Royal, Canada

[73] Assignee: Canadian International Paper Company; Quebec North Shore Paper Company, both of Montreal, Quebec; Abitibi St. Anne Paper Ltd., Beaupre, Quebec, all of Canada; part interest to each

[22] Filed: Mar. 2, 1971

[21] Appl. No.: 120,300

[30] Foreign Application Priority Data
Mar. 3, 1970 Canada .............................. 076349

[52] U.S. Cl. ......... 144/309 AC, 144/3 D, 144/34 R
[51] Int. Cl. ............................................ A01g 23/08
[58] Field of Search ............ 144/3 D, 34 E, 309 AC

[56] References Cited
UNITED STATES PATENTS

| | | | |
|---|---|---|---|
| 3,468,352 | 9/1969 | Larson et al. | 144/3 D |
| 3,487,864 | 1/1970 | Larson et al. | 144/3 D |
| 3,371,692 | 3/1968 | Larson et al. | 144/3 D |

Primary Examiner—Gerald A. Dost
Attorney—Jacobi, Lilling & Siegel

[57] ABSTRACT

A mobile tree feller skidder including a felling head attached to the free end of an extendible and retractable boom pivotally mounted on a mobile vehicle to slew about a vertical axis. The felling head includes a grapple accumulator and shear mounted on a common frame, the grapple accumulator having resilient means biasing the bite to a selected minimum size and a gate through which trees are forced sideways into the accumulator against the spring bias by forcing the felling head onto a standing tree of the shear jaw in an open position. A tree or trees are first placed in the accumulator and then severed and the felling head moved to place a further tree in the accumulator with the process continuing until a desired number of trees are collected in the accumulator and then felled, depositing the butt end of the collected trees on a tong-type bunk, mounted on the vehicle.

22 Claims, 8 Drawing Figures

Patented July 31, 1973

INVENTOR
DOUGLAS D. HAMILTON
BY Jacobi, Lilling + Siegel
ATTORNEYS

METHOD AND APPARATUS FOR FELLING TREES

The present invention relates to improvements in the method and apparatus in the art of tree felling.

Prior apparatus for felling trees includes felling heads mounted on an extendible and retractable boom, each tree being handled individually. The cycle for handling each tree consists of manipulating the boom to place the grapple portion of the felling head on the base of the tree and grasp the same after which the serving device severs the tree close to the ground. The tree is then controllably felled by the felling head and placed upon the ground or, alternatively, on a bunk-type skidder on which the boom is also mounted and the cycle is repeated to harvest the next tree.

Attempts have been made to sever a cluster of trees by clamping the same together and severing the same at one time as exemplified by Larson's U.S. Pat. No. 3,238,981 issued Mar. 8, 1966. This process, however, is limited to the number of trees that are sufficiently close to one another in order to be grasped by the gasping apparatus.

More recent developments include severing standing trees and collecting the severed trees in an accumulator which retains the same adjacent the severing device such that several trees may be severed and subsequently felled. One such apparatus is disclosed in Larson et al. Canadian Pat. No. 815,870 issued June 24, 1969. In the patented structure, there is disclosed an accumulator mounted on the end of an extendible and retractable boom for collecting trees after they have been severed by a shear mechanism located adjacent the accumulator. The trees are severed by the severing device and subsequently positioned in the accumulator where they are retained in an upright position while further trees are successively severed and placed in the accumulator.

A principal object of the present invention is to improve the efficiency of harvesting standing trees and this is accomplished in the present invention by positioning the standing tree to be servered in the accumulator and subsequently severing the same. This eliminates the transfer step necessary in the Larson et al apparatus where, as mentioned, the tree is severed and then moved from the severing apparatus into the accumulator.

The applicant, in developing the present invention, has kept the following objectives in mind:

1. to provide an accumulator-type grapple for use in handling trees so as to reduce the swing, unloading cycles;
2. keep the grapple simple and as light as possible for purposes of stability;
3. keep the grapple as compact as possible for the purpose of manoeuverability of the felling head on selection cutting and/or moving the felling head during loading and unloading operations where the accumulator-type grapple, in accordance with the present invention, is mounted on a frame with a shear for severing standing trees. Compactness in this regard is obtained by having the accumulator located directly over the shear.

Accordingly, in accordance with one aspect of the present invention, there is provided a method in felling trees which comprises:

a. placing a growing tree or trees in an accumulator;
b. positively gripping said tree;
c. severing said tree; and
d. placing a further tree or trees in said accumulator and repeating the step of severing the same until the accumulator has been filled with the desired quantity of trees severed from their stump.

In accordance with a further aspect of the present invention, there is provided apparatus for use in effecting the foregoing method, said apparatus including a grapple characterized in combination of:

a. a frame having a jaw with a throat;
b. resilient means biasing said jaw to a selected minimum size and providing a bite variable in size upon the application of forces applied thereto; and
c. a self-closing gate in said throat permitting entry of elongated objects therethrough into the bite by sideways movement of such object and retain such object, along with further objects accumulated therein, in said grapple by the biasing force provided from the means resiliently biasing the bite of the grapple to its minimum size.

In accordance with a still further aspect of the present invention, there is provided a felling head for use in felling standing trees which includes:

A. a grapple mounted on a frame and consisting of a free accumulator in combination with a gate allowing entry of trees into the accumulator and means for retaining the trees in the accumulator; and
B. a severing device secured to said frame characterized in that a cutting member of severing device traverses an imaginary extension of the end area of the accumulator whereby standing trees are severed subsequent to being placed in the accumulator.

The invention is illustrated by way of example in the accompanying drawings wherein.

Figure 1:
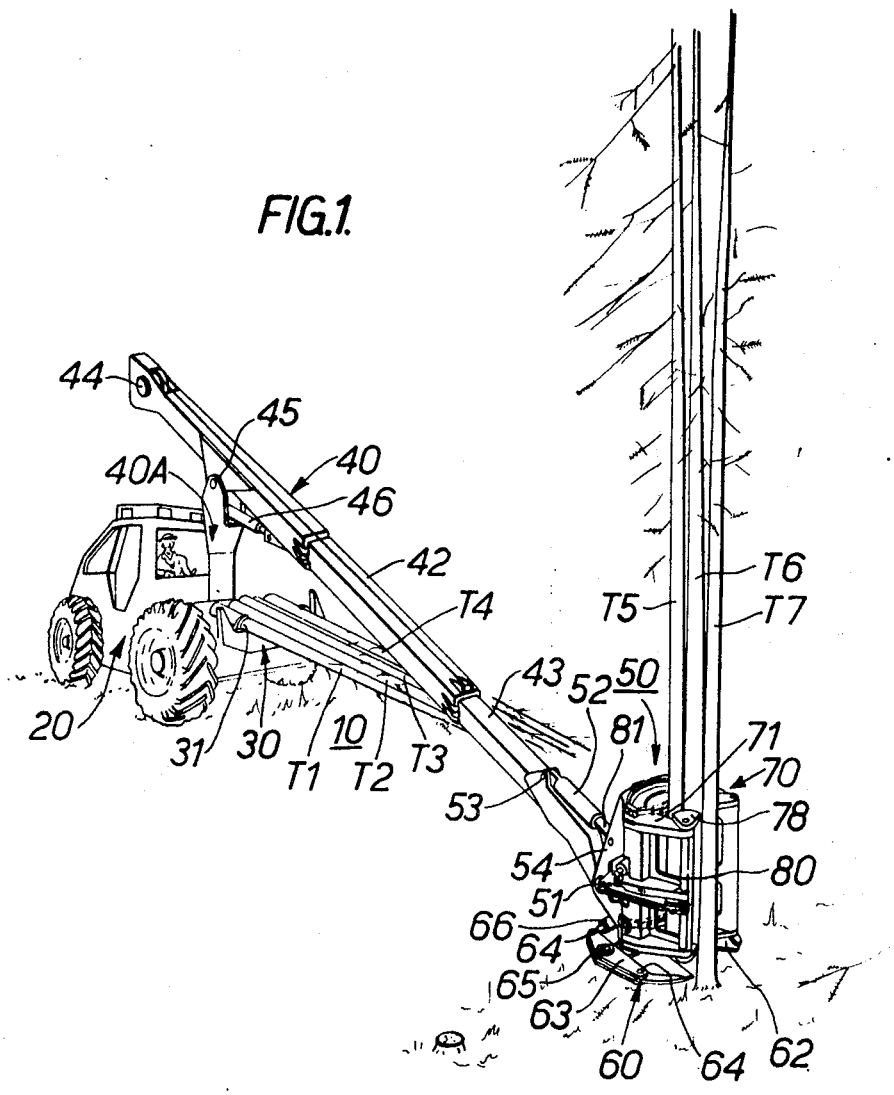
FIG. 1 is an oblique diagrammatic illustration of the grapple of an accumulator and severing device associated therewith mounted on the free end of an extendible and retractable boom carried by a mobile skidder.

Referring now in detail to the drawings, illustrated in FIG. 1 is a tree feller skidder 10 consisting of a mobile tractor 20 having a bunk 30 attached thereto adjacent the trailing end thereof and anchoring the butt end of trees T1, T2, T3 and T4 to the vehicle for skidding the same. An extendible and retractable boom assembly 40 is pivotally mounted on the vehicle by a post 40A to slew about a vertical axis and carried on the free end of the boom is a felling head 50. The felling head consists of a shear 60 and a grapple accumulator 70 with the shear being located vertically below the accumulator to sever growing trees placed in the accumulator. The accumulator includes a gate biased to a normally closed position and controllably opened by the vehicle operator such that trees accumulated in the accumulator may be deposited on the bunk when the accumulator is moved to a position vertically above the bunk on the vehicle. The felling head assembly 50 may be readily attached to the free end of any extendible and retractable boom. In the present embodiment, there is illustrated a telescopic boom as this is deemed to more readily provide the function of pressing the accumulator onto standing trees against a spring-biased tree-engaging mechanism in the accumulator which will be described more fully hereinafter. As will be readily apparent from FIG. 1, the mobile feller is moved into the vicinity of standing trees and a tree in a growing position is placed in the accumulator and thereafter severed vertically below the accumulator such that the severed tree remains standing up in the accumulator with previously severed trees while the felling head is manipulated to a position for grasping and felling a further tree.

The bunk 30 includes a plurality of arcuate arms controllably movable in pairs for selectively engaging and dis-engaging trees placed on the otherwise generally U-shaped bunk. The bunk is fully disclosed in applicant's U.S. Pat. No. 3,289,865 issued Dec. 6, 1966, and should further description of the same be desired, it may be obtained from such patent.

The boom 40 is a telescopic type having a fixed section 41 pivotally mounted on the post 40A by a pin 45 and is controllably moved by a hydraulic piston-cylinder assembly which is extendible and retractable and connected at opposed ends respectively to the boom section 41 and the post 50. Telescopically arranged within fixed boom member 41 are members 42 and 53 controllably moved to extend and retract the boom by hydraulic cylinders, cables, or the like, cables being diagrammatically illustrated and wound on a driven winch assembly 44 located on the boom section 41. There are numerous telescopic booms known which are readily suitable for the present apparatus and, accordingly, no further detailed description of the same is believed necessary. The telescopic boom 40 may even be replaced by a knuckle boom or the like, but as will be seen hereinafter and previously mentioned, the telescopic boom is deemed more suitable.

The felling head is pivotally mounted on the free end of the telescopic boom 40 by a pin 51 and is controllably tilted by an extendible and retractable hydraulic piston-cylinder assembly 52 connected at opposed ends respectively to the boom and felling head by pins 53 and 54.

The shear 60 consists of a pair of shear blades 61 and 62 pivotally connected to respective ones of a pair of lever arms 63 by a pin 64, the lever arms 63 being pivotally mounted on opposed ends of an elongated frame 64 by respective ones of a pair of pivot pins 65. Movement of the cutting members toward and away from one another is effected by extension and retraction of an hydraulic piston-cylinder assembly 66 controlled by the operator on the vehicle. The shear blades 61 and 62 are further connected to the frame 64, for example, by sliding engagement as illustrated in Kesler's Canadian Pat. No. 826,462 issued Nov. 4, 1969 or some other sliding pivot or, alternatively, a pair of link members each pivotally connected to the frame and pivotally connected in spaced relation thereto with respective ones of the shear blades or mountings therefor, as for example illustrated in applicant's Canadian Pat. No. 791,445 issued Aug. 6, 1968. The shear blades 61 and 62 have cutting edges in face-to-face relation movable in a direction toward and away from one another traversing a projected bite area of the grapple accumulator. As previously mentioned, trees accordingly are first placed in the accumulator and subsequently severed by the shear. As the trees accumulate, they are pressed rearwardly as will be seen hereinafter, in the accumulator against a spring bias and the shear blades accordingly need only traverse sufficient area to sever as many trees as are placed in the accumulator at one time and which, under normal circumstances, would be only one tree adjacent the gate 70.

Figure 2:
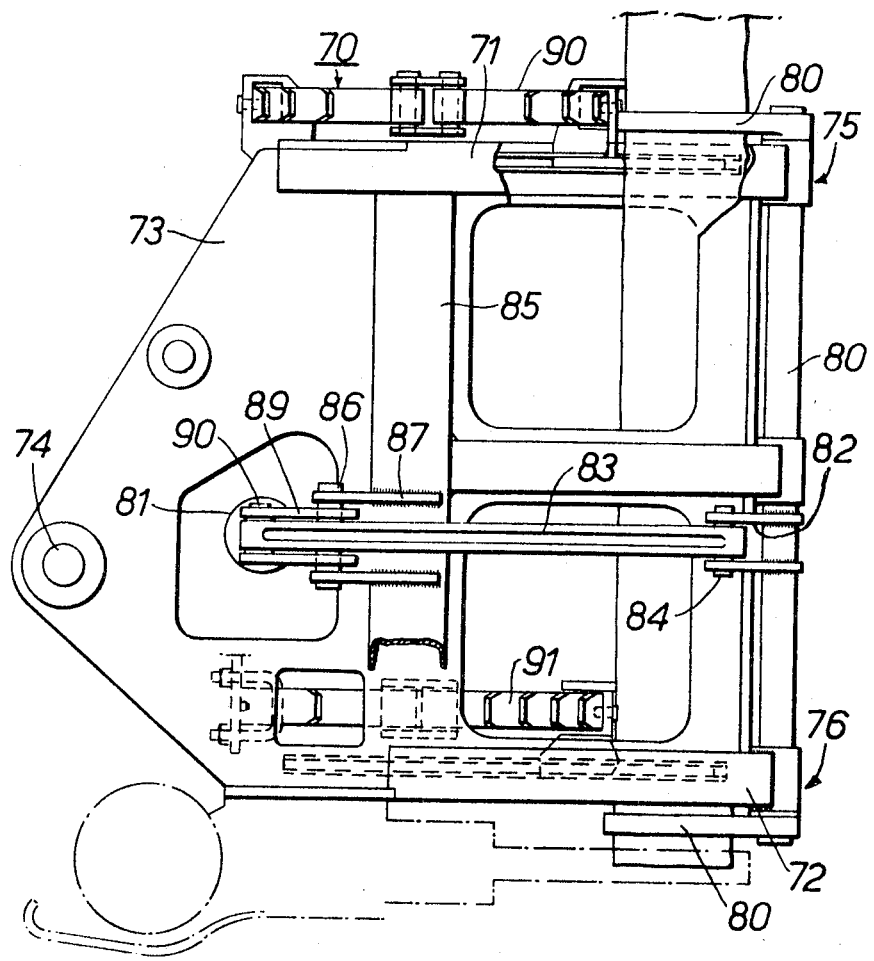
FIG. 2 is a side elevational view of the accumulator illustrated in FIG. 1.
Figure 3:
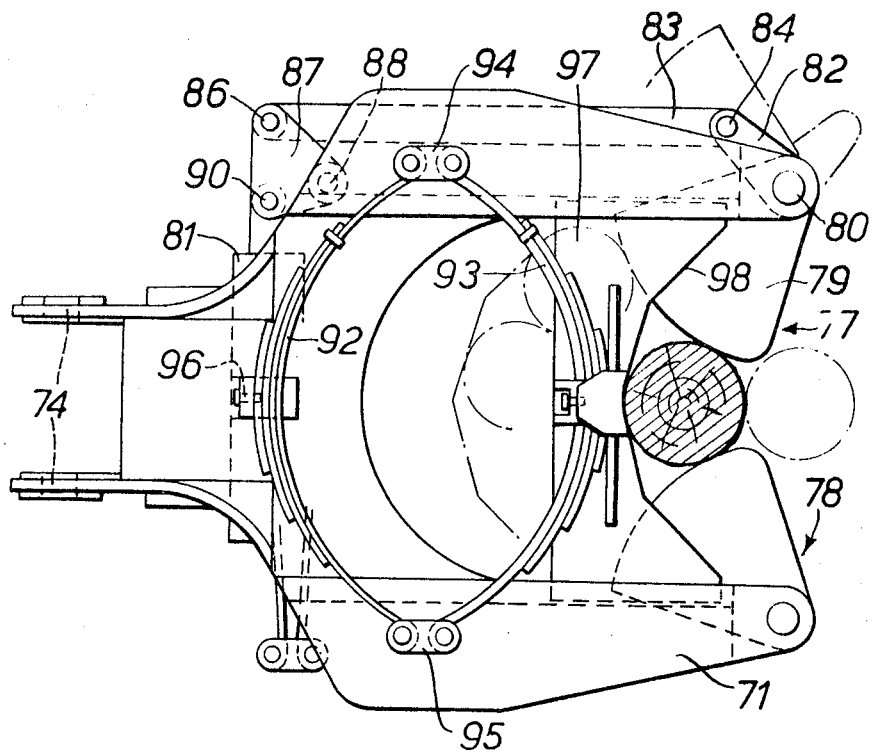
FIG. 3 is a top plan view of FIG. 2.

The grapple accumulator 70 illustrated in FIGS. 1, 2 and 3 consists of respective upper and lower U-shaped members 71 and 72 rigidly connected to a frame member 73 and projecting forwardly therefrom. The frame member 73 has an aperture 74 to receive pivot mounting pin 51 attaching the felling head to the boom. The U-shaped members 71 and 72 are similarly oriented having respective throats 75 and 76 selectively opened and closed by a gate consisting respective members 77 and 78. Each gate member 77 and 78 includes a pair of segmental plate members 79 connected to opposed ends of a shaft 80 pivotally mounted on the upper and lower plates 71 and 72. The gate members 77 and 78 are arranged to allow a tree or trees to be pressed therethrough into the bite of the U-shaped frame members 71 and 72 and the gate is biased to a normally closed position by an accumulator 81 connected to the respective pair of rods 80 through a link system. Each rod 80 has a pair of lugs 82 secured thereto receiving a link member 83 therebetween and which is pivotally attached thereto by pin 84. The opposite end of the links 83 are connected to respective ones of a pair of intermediate shafts 85 journalled for rotation in the respective upper and lower members 71 and 72. The link 83 as seen in FIG. 2, is connected by a pin 86 to a further link 87 which, in turn, is pivotally connected to a lug secured to the shaft 85 by a pin 88. Link 87 is connected by a pin 90 to the hydrualic accumulator 81. The accumulator 81 applies forces through the link members 83 normally moving the gate portions 77 and 78 to a closed position. If desired, accumulator 81 may be replaced by an extendible and retractable hydrualic piston-cylinder assembly such that the gate may be opened by external physical forces applied to the gate members and selectively opened and closed by appropriate control of fluid to the cylinder.

Referring to FIG. 1, there are illustrated trees T5 and T6 held in the accumulator with tree T7 located partially through the gate. The trees are placed in the accumulator before severing and the severed trees retained in the accumulator so as to be held in an upright position. In order to permit moving the felling head from one position to another, the trees are clampingly engaged in the accumulator and accordingly reference throughout the specification has been made herein to a grapple accumulator. The trees are held in the accumulator by resilient means pressing the trees against the gate, such resilient means providing a variable sized bite which is increased in size by physically forcing a tree or trees through the gate into the accumulator against such spring bias. Various embodiments of the resilient means for applying forces to the trees are illustrated with one such means in FIGS. 1 and 2 consisting of respective upper and lower spring members 90 and 91 secured to the frame adjacent respective U-shaped members 75 and 76 and having portions engageable with the tree engaged in the accumulator.

Referring to FIG. 3, spring assembly 90 consists of semi-elliptical springs 92 and 93 interconnected at opposed ends by respective shackles 94 and 95. The spring 92 is secured to the grapple frame member 73 by a clamp 96 while spring member 93 is fastened to a plate 97 slidably mounted for movement in a guide channel formed in the U-shaped member 75 associated therewith. The plate 97 has an arcuate edge 98 engageable with the trees as they pass through the gate of the accumulator. The plate 97 may be held for sliding movement in any convenient manner as, for example, channels or the like in the U-shaped frame or some mechanical equivalent of the same. The intended purpose of plate 97 is to provide an arcuate outer edge surface 98 which abutts the trees holding the same firm in the accumulator regardless of the number of trees which might be collected therein within, of course, the capacity of the accumulator. Movement of the plate 97 varies the bite of the accumulator and thereby varies the tree-holding capacity of the same, resilient bias being provided by springs 92 and 93. The spring characteristics of the same are chosen such as to provide the necessary force to hold the trees in an upright position during movement of the felling head in collecting further trees in the same. The lower spring unit 91 is the same as that described with reference to spring 90 and accordingly, it will be seen the trees are engaged at two positions spaced longitudinally therealong.

Figure 4:
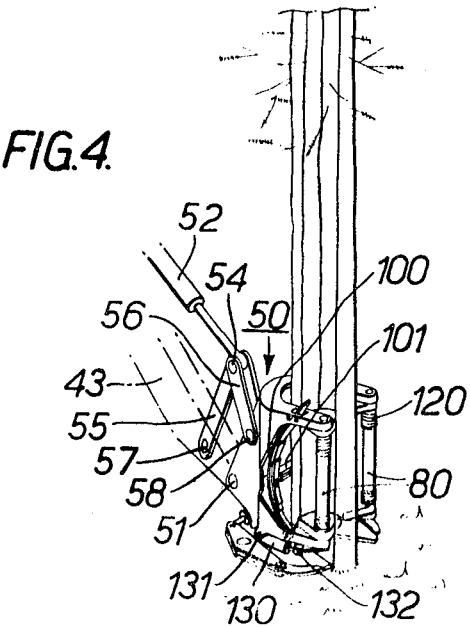
FIG. 4 is a view similar to FIG. 1 but including only the accumulator and shear portion and illustrating a modified version of the accumulator.

The spring assemblies 90 and 91 may be replaced by various equivalents for applying resilient forces against trees in the accumulator holding the same therein. A modified version of the same is illustrated in FIG. 4 wherein a pair of semi-elliptical spring assemblies 100 are interconnected by a bar member 101 midway between opposed ends of respective ones thereof with such oposed ends being anchored as, for example, by passing through apertures in the upper and lower U-shaped members 71 and 72. In passing through the apertures, the ends of the springs are slidably mounted in the respective U-shaped members avoiding the use of shackles and bar 101 provides engagement with the trees to be retained in the accumulator pressing the same against the gate. The member 101 may be a straight bar or arcuate in plan view, having a surface corresponding to surface 98 of the embodiment illustrated in FIG. 3. Also, in utilizing the bar 101, the engaging surface may be smooth, spiked, or ribbed depending upon the desired results required in holding the trees.

Before describing further various embodiments of the spring assembly for applying resilient forces to the trees, it will be noted in FIG. 4 there is illustrated a modified version of the gate-closing apparatus wherein accumulator 81 has been replaced by a plurality of torsion springs 120 mounted on the gate mounting shafts 80 and anchored at opposed ends respectively to the frame portion of the accumulator and the shaft. Resilient bias closing the gate accordingly is provided by the torsion springs 120 and selective opening of the gate is accomplished by control of a hydraulic piston-cylinder assembly 130 anchored at opposed ends respectively to the accumulator frame and the gate portion associated therewith. In effect, a pair of hydraulic piston-cylinder assemblies 30 are utilized, only one being illustrated in FIG. 4 connected respectively at opposed ends by pins 131 and 132 to the frame and a lug extension secured to and projecting from the shaft 80. A still further modification is illustrated in FIG. 4 wherein the hydraulic piston-cylinder assembly 52, instead of being connected directly to the felling head, has pivot pin 54 interconnecting a pair of link members 55 and 56 anchored at their opposite end respectively to the boom and felling head by pins 57 and 58.

Figure 5:
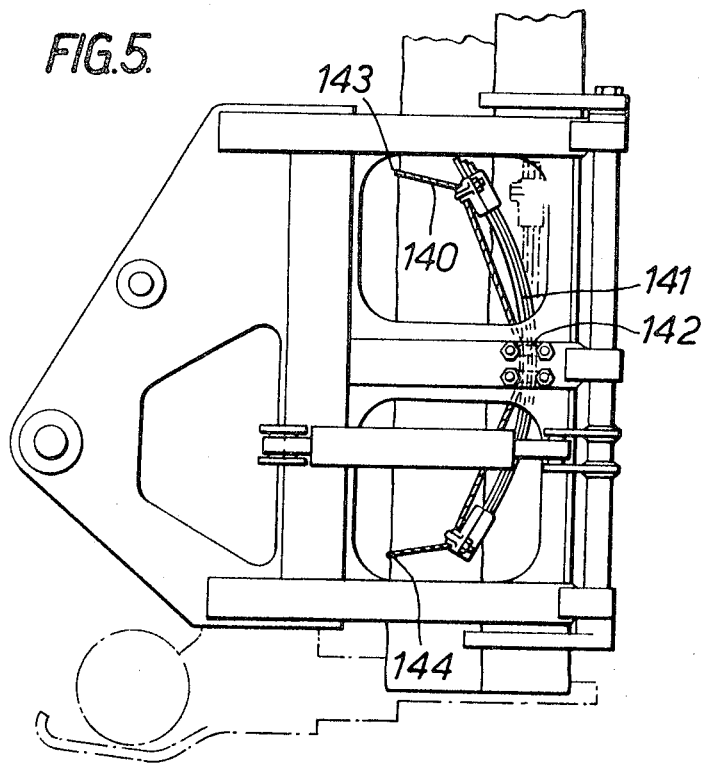
FIG. 5 is a side elevational view similar to FIG. 2, illustrating a still further modified accumulator.
Figure 6:
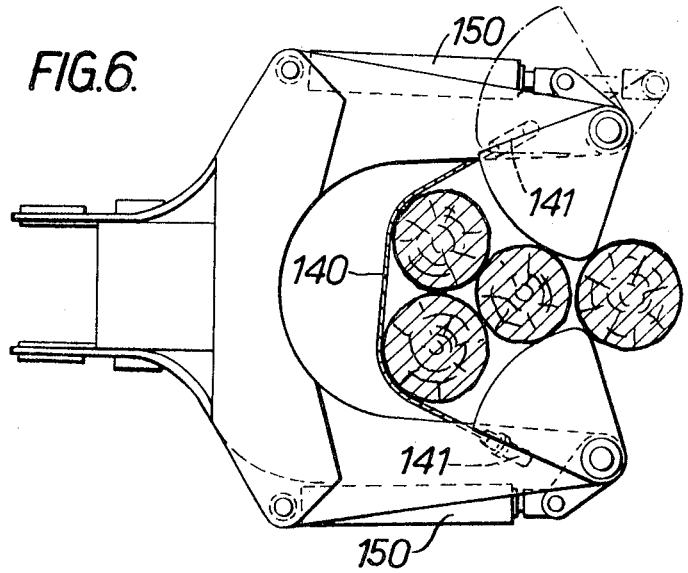
FIG. 6 is a top plan view of FIG. 5.

Referring now to FIGS. 5 and 6, there is illustrated a modified spring means consisting of a cable 140 attached to the free end of a pair of semi-elliptical springs 141 (only one shown) anchored intermediate opposed ends thereof by brackets 142 to the accumulator frame. The cable attached to the pair of springs 141 forms a cradle for engaging trees in the accumulator at vertically spaced positions designated respectively 143 and 144 in FIG. 5. In the embodiment illustrated in FIGS. 5 and 6, the gate portions 77 and 78 are controlled respectively by accumulators 150 and 151 which alternatively may be extendible and retractable hydraulic piston-cylinder assemblies controlled by the operator of the vehicle for selectively opening the gate after trees have been accumulated in the accumulator and which are to be deposited by dropping the same on the bunk of the vehicle or some other apparatus.

Figure 7:
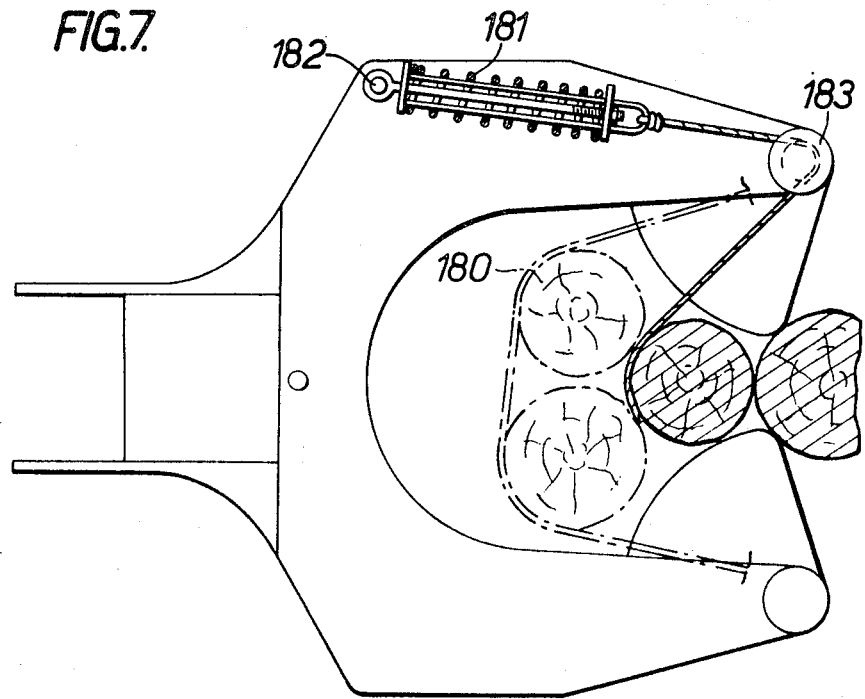
FIG. 7 is a top plan view similar to FIG. 6, illustrating a still further modified accumulator.

In FIG. 7, there is illustrated a still further resilient means varying the size of the bite of the grapple accumulator and which consists of a cable 180 anchored at opposed ends to respective ones of a pair of tension spring members 181 which, in turn, are anchored to the grapple frame by a pin or the like 182. The cable is attached to the opposite end of the spring member 181 and passes over a pulley or sheave 183 mounted on respective ones of the pair of shafts 80.

Figure 8:
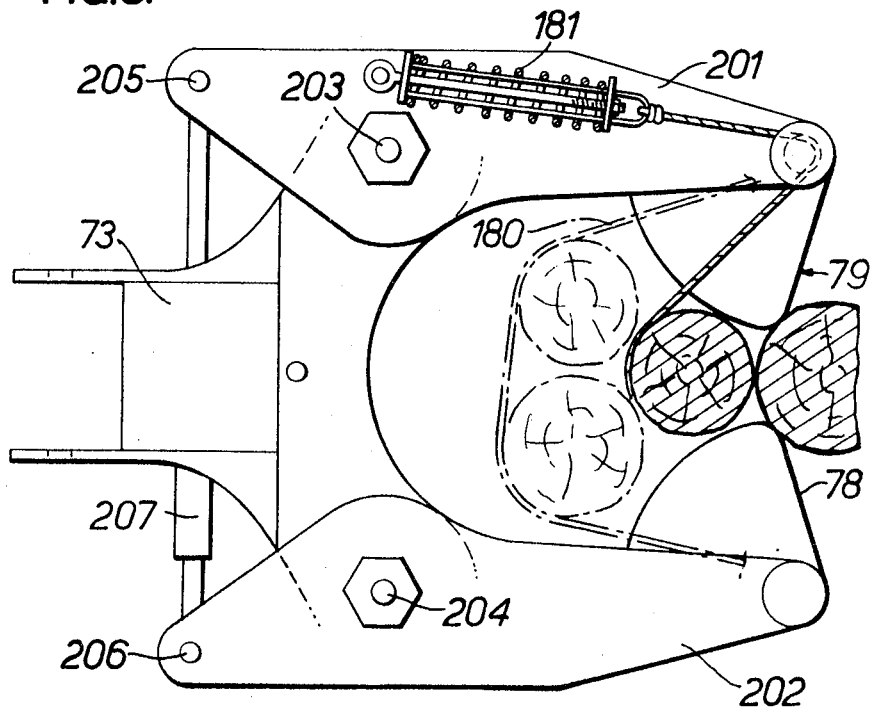
FIG. 8 is a top plan view similar to FIGS. 6 and 7, illustrating a still further modified accumulator.

A still further embodiment of the grapple accumulator is illustrated in FIG. 8. In each of the foregoing embodiments, the upper and lower members 75 and 76 are rigid U-shaped members having a throat with entry of objects thereto being controlled by opening and closing of the gate. In FIG. 8, it will be noted the grapple accumulator is provided with respective jaw members 201 and 202 pivotally mounted on the frame 73 by respective pivot pins 203 and 204. The gate portions 77 and 78 are carried by respective members 201 and 202 and accordingly, such gate need only be a one-way control permitting only entry of trees into the accumulator 70. Opening of the grapple jaw in such case may be effected by pivoting the respective members 201 and 202 about pivot pins, for example, by an extendible and retractable hydraulic piston-cylinder assembly 204 controlled by the operator and connected at opposed ends to respective members 201 and 202 by pins 205 and 206. The bite of the jaw provided by the grapple may be resiliently retained at a minimum size by apparatus of any of the foregoing types, for example a cable 180 and spring means 181 illustrated and described with reference to FIG. 7. The accumulator, accordingly, may have the bite size thereof varied by the cable member 180 and/or movement of the grapple jaw members 201 and 202.

From the foregoing, it will be readily apparent there are numerous modifications to resilient means for retaining trees in the accumulator after they have been severed from their stump. The felling head, in accordance with the present invention and various other aspects of the same, all operate in the same manner by having trees pass through the gate while still attached to their stump and placed in the accumulator before severing is effected. In each of the foregoing embodiments, the felling head is placed on the tree by having the shear in a jaw open position and pressing the felling against the tree by extension of the boom to force the tree through the gate against the spring-biased means for retaining the tree in the accumulator, the gate closing after the tree has passed therethrough holding the tree in the accumulator. Effectively, the felling head acts as a clinging member to the tree by throwing the same against the tree with force sufficient to cause the tree to pass through the gate and this is found to be accomplished effectively by a telescopic boom. As previously mentioned however, other booms may be used for the same purpose but maximum speed and efficiency is found to be obtained using telescopic booms. After the operator has extended the boom sufficiently to place a standing tree in the accumulator, he controls operation of the shear mechanism, or this may be done automatically upon closing of the gate, to sever the tree and the cycle is then repeated by moving the felling head to a further standing tree to be severed and placing the same in the accumulator by forcing the same onto the tree through extension of the boom. After a sufficient number of trees have been collected in the accumulator, in keeping with the capacity of the same, the boom and felling head are manipulated placing the butt end of the collected trees on the bunk of the vehicle 20. It can thus readily be seen applicant has provided improvements in the harvesting of trees by minimizing manipulation of the boom and felling head combination for severing and collecting standing trees.

I claim:

1. A method of felling trees and collecting the same, comprising:
    a. placing a growing tree or trees in an accumulator for collecting such trees;
    b. positively gripping said tree or trees placed in the accumulator retaining the same therein;
    c. severing said tree or trees, placed in the accumulator, from their stump;
    d. placing a further growing tree or trees in said accumulator in side-by-side relation and engagement with the previous trees collected in the accumulator while maintaining said positive grip on the latter-mentioned collected trees;
    e. positively gripping said further tree or trees placed in the accumulator retaining the same therein along with the previously collected trees;
    f. severing said further tree or trees from their stump; and
    g. repeating the foregoing steps (a) to (e) until a selected quantity of trees has been collected in said accumulator.

2. A method as defined in claim 1 wherein said accumulator is attached to a standing tree to be severed by forcibly driving the same onto the tree.

3. A method of felling trees which comprises:
    a. placing a growing tree or trees in an accumulator for trees;
    b. positively gripping said tree, holding the same firmly in said tree accumulator;
    c. severing said tree or trees placed in the tree accumulator; and
    d. placing a further tree or trees in said tree accumulator and repeating the step of severing the same until the tree accumulator has been filled with the desired quantity of trees severed from their stump.

4. A device adapted to be secured to the free end of an extendible and retractable boom for severing trees in a growing position nd accumulate a plurality of the severed trees and firmly hold the same while using the device for severing further trees comprising in combination:
    a. a frame having means on said frame arms thereon spaced apart from one another defining a selected area for receiving tree trunks, said selected area being larger than the cross-sectional area of the stump end of a plurality of trees and having a throat through which the trees pass in placing the same in said area;
    b. a gate movably mounted on said arms traversing said throat controlling movement of trees therethrough;
    c. resilient means, on said frame, varying said area and biased to a minimum size area adjacent said gate; and
    d. a tree severing device secured to said frame and located below the arms and gate in a tree cutting position, said severing device having a cutting member movable relative thereto traversing at least the minimum size of said area whereby trees to be severed must first be placed in said accumulator and then severed.

5. A grapple as defined in claim 4 wherein said means varying the bite size of the jaw and the gate together engage articles collected therein at at least three positions, two of which are spaced relative to one another along the length of such articles on one side thereof and the remainder of which are on the opposite side whereby elongated articles are stabilized in the accumulator.

6. Apparatus for severing a tree and accumulating a plurality of severed trees comprising a vehicle, a boom mounted on said vehicle, a felling head pivotally mounted on said boom, means connected to said boom and said felling head for pivoting the latter relative to the boom between a standing tree severing position and a tilted, tree felled, position, said felling head comprising a tree accumulator grapple including a frame, means on said frame bounding an area larger than the cross-sectional area of the stump end portions of a plurality of trees severed from their stump and having a throat opening to the aforementioned bounded area through which the trees are moved sideways during placing of the same in said area, a self-closing gate comprising at least one member movably mounted on said frame traversing said throat permitting trees to be forcibly moved therethrough into said area, means movably mounted on said frame for varying the size of said area and resiliently biased in a direction toward said throat providing a minimum size of said area adjacent said throat and a tree severing device mounted on said frame and located at a position below said grapple and gate in a tree severing position, said severing device having a cutting member movable to traverse at least said minimum bounded area for severing a growing tree located therein, said accumulator grapple successively receiving growing trees as they are placed therein and subsequently severed from their respective stumps.

7. A tree accumulator grapple as defined in claim 4, wherein said gate comprises a pair of cam members pivotally mounted on said frame means on said frame resiliently biasing said cam members to a gate-closed position.

8. A tree accumulator grapple as defined in claim 7 wherein each of said pivotally mounted cam members have an arcuate face engageable with tree trunks in the selected area.

9. A tree accumulator grapple as defined in claim 4 wherein said means resiliently biasing the gate to a closed position comprises an accumulator, hydraulic piston cylinder assembly.

10. A tree accumulator grapple as defined in claim 7 wherein there are a plurality of cam-shaped members with such cam-shaped members being mounted in pairs and including means pivotally moving all of said cam members in unison selectively to open said gate.

11. A grapple accumulator as defined in claim 4 wherein said frame includes a longitudinally extending frame member and two or more pairs of arms secured to said frame member at positions spaced relative to one another longitudinally therealong, said pairs of arms being commonly oriented relative to the frame and projecting outwardly therefrom with the free terminal ends of the arms of the respective pairs being spaced from one another to provide said throat.

12. A tree grapple accumulator as defined in claim 4 wherein said means varying the area of the accumulator for receiving the trees comprises at least one spring connected to said frame and at least one tree-engaging member secured to said spring member.

13. A tree grapple accumulator as defined in claim 12, including two or more springs, each anchored to said frame and wherein said tree-engaging members are secured to each of said springs.

14. A device adapted to be secured to the free end of an extendible and retractable boom for severing trees in a growing position and accumulate a plurality of the severed trees firmly holding such collected trees while using the device for severing further trees comprising in combination:
  a. a frame including a longitudinally extending frame member;
  b. two or more pairs of arms secured to said frame member at positions spaced relative to one another longitudinally along said frame member, said pairs of arms being commonly oriented relative to the frame and projecting outwardly therefrom with the free terminal ends of the arms of the respective pairs being spaced from one another partially bounding a selected area larger than the cross-sectional area of the stump end of a plurality of trees, the spaced-apart terminal ends of the arms providing a throat through which trees pass while being placed in said selected area;
  c. a gate traversing said throat, controlling movement of trees therethrough, said gate comprising a pair of cam members pivotally mounted on the free end of respective ones of said pair of arms;
  d. means on said frame varying said selected area;
  e. means resiliently biasing said movable member to a selected minimum size adjacent said throat; and
  f. a tree severing device secured to said longitudinally extending frame adjacent one end thereof and having a cutting member movable in a direction perpendicular to the length of said longitudinally extending member traversing at least the minimum size of said selected area whereby trees to be severed are first placed in the accumulator and subsequently severed.

15. A device as defined in claim 14 wherein said spring means resiliently biasing the movable member comprises a pair of semi-elliptical springs mounted on said frame and having a portion thereof movable in a direction toward and away from said throat.

16. A device adapted to be secured to the free end of an extendible and retractable boom for severing and handling a plurality of trees, comprising in combination:
  a. an accumulator for use in collecting trees and having open opposite ends through which trees in the accumulator may extend;
  b. a gate movably mounted on the accumulator through which the trees pass in being placed in said accumulator;
  c. a tree severing device secured to the accumulator and located at a position below a selected area in which trees collected in the accumulator are located and oriented such as to allow severing standing trees from their stump when located in the accumulator; and
  d. tree engaging means movably mounted on the accumulator and arranged, together with said gate, to positively grip and firmly hold the collected trees in the accumulator even while further trees are introduced into the same.

17. A device as defined in claim 16 wherein said gate includes at least two members pivotally secured to said accumulator at positions spaced apart from one another.

18. A device as defined in claim 17 including two pairs of pivotally mounted gate members with one pair spaced vertically above the other in a tree-cutting position.

19. A device as defined in claim 16 wherein said tree-engaging means is resiliently biased in a direction toward said gate.

20. A device as defined in claim 16 wherein said tree-engaging means has a roughened face directed toward trees in the accumulator for engaging the same facilitating gripping thereof.

21. A device as defined in claim 20 wherein said roughened face comprises a plurality of spikes.

22. A device as defined in claim 20 wherein said roughened surface comprises at least one rib extending transversely to the length of trees in the accumulator.

* * * * *